(12) United States Patent
Priscal et al.

(10) Patent No.: US 12,304,712 B2
(45) Date of Patent: May 20, 2025

(54) RECYCLABLE FILM FOR THERMOFORMING

(71) Applicant: AMCOR FLEXIBLES NORTH AMERICA, INC., Neenah, WI (US)

(72) Inventors: Michael D. Priscal, Neenah, WI (US); Jacob A. Lasee, New London, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 18/387,779

(22) Filed: Nov. 7, 2023

(65) Prior Publication Data

US 2024/0076110 A1 Mar. 7, 2024

Related U.S. Application Data

(63) Continuation of application No. 17/439,003, filed as application No. PCT/US2020/026642 on Apr. 3, (Continued)

(51) Int. Cl.
*B65D 65/40* (2006.01)
*B29C 51/14* (2006.01)
(Continued)

(52) U.S. Cl.
CPC .............. *B65D 65/40* (2013.01); *B29C 51/14* (2013.01); *B32B 27/08* (2013.01); *B32B 27/20* (2013.01);
(Continued)

(58) Field of Classification Search
CPC ...... B65D 65/40; B65D 75/327; B29C 51/14; B32B 27/08; B32B 27/20; B32B 27/306;
(Continued)

(56) References Cited

U.S. PATENT DOCUMENTS

| 3,783,089 A | 1/1974 | Hurst et al. |
| 4,403,710 A | 9/1983 | Hirota et al. |

(Continued)

FOREIGN PATENT DOCUMENTS

| CA | 2479738 A1 | 3/2005 |
| CN | 103131070 A | 6/2013 |

(Continued)

OTHER PUBLICATIONS

Micho, Tubular Multilayer Stretch Film Manufacturing Technology and its properties and uses, China Academic Journal Electronic Publishing House, 1985, 13 pages.

(Continued)

*Primary Examiner* — Kareen K Thomas

(57) ABSTRACT

Recyclable films having a first layer containing a polyethylene, a second layer containing a high-density polyethylene and a hydrocarbon resin, and a third layer containing a polyethylene may be used for thermoforming packaging components. Both the first and third layers have an overall density between about 0.92 g/cm³ and 0.97 g/cm³. The film structure is advantageous as it can be more easily thermoformed than traditional high-density polyethylene films and can maintain the shape taken during thermoforming, exhibiting minimal warping or shrinking.

20 Claims, 5 Drawing Sheets

Related U.S. Application Data 2020, now Pat. No. 11,981,487, which is a continuation-in-part of application No. PCT/US2020/017298, filed on Feb. 7, 2020, and a continuation-in-part of application No. PCT/US2019/047530, filed on Aug. 21, 2019, and a continuation-in-part of application No. PCT/US2019/047523, filed on Aug. 21, 2019.

(51) Int. Cl.

| | | |
|---|---|---|
| *B32B 27/08* | (2006.01) | |
| *B32B 27/20* | (2006.01) | |
| *B32B 27/30* | (2006.01) | |
| *B32B 27/32* | (2006.01) | |
| *C08J 5/18* | (2006.01) | |
| *C08K 3/26* | (2006.01) | |
| *B65D 75/32* | (2006.01) | |

(52) U.S. Cl.
CPC .......... *B32B 27/306* (2013.01); *B32B 27/327* (2013.01); *C08J 5/18* (2013.01); *C08K 3/26* (2013.01); *B32B 2250/03* (2013.01); *B32B 2250/04* (2013.01); *B32B 2250/242* (2013.01); *B32B 2250/246* (2013.01); *B32B 2264/10* (2013.01); *B32B 2264/104* (2013.01); *B32B 2307/308* (2013.01); *B32B 2307/31* (2013.01); *B32B 2307/4023* (2013.01); *B32B 2307/558* (2013.01); *B32B 2307/72* (2013.01); *B32B 2435/02* (2013.01); *B32B 2439/70* (2013.01); *B32B 2439/80* (2013.01); *B65D 75/327* (2013.01); *C08J 2323/06* (2013.01); *C08J 2331/04* (2013.01); *C08K 2003/265* (2013.01)

(58) Field of Classification Search
CPC .............. B32B 27/327; B32B 2250/03; B32B 2250/04; B32B 2250/242; B32B 2250/246; B32B 2264/10; B32B 2264/104; B32B 2307/308; B32B 2307/31; B32B 2307/4023; B32B 2307/558; B32B 2307/72; B32B 2435/02; B32B 2439/70; B32B 2439/80; B32B 2255/10; B32B 1/00; B32B 3/30; B32B 7/05; B32B 27/18; B32B 27/30; B32B 27/32; B32B 27/34; B32B 2250/02; B32B 2250/24; B32B 2250/40; B32B 2264/00; B32B 2264/102; B32B 2270/00; B32B 2272/00; B32B 2307/30; B32B 2307/50; B32B 2307/7242; B32B 2307/7244; B32B 2307/75; B32B 2435/00; C08J 5/18; C08J 2323/06; C08J 2331/04; C08K 3/26; C08K 2003/265; C08L 23/06; C08L 23/04; Y02P 70/10
See application file for complete search history.

(56) References Cited

U.S. PATENT DOCUMENTS

| | | | |
|---|---|---|---|
| 4,537,305 A | | 8/1985 | Takanashi |
| 4,684,025 A | | 8/1987 | Copland et al. |
| 5,176,314 A | * | 1/1993 | Akazawa .......... B29C 66/81427 229/123.1 |
| 5,393,032 A | * | 2/1995 | Cederroth .......... B65D 77/2052 206/532 |
| 5,522,506 A | | 6/1996 | Roulin et al. |
| 5,631,036 A | * | 5/1997 | Davis .................. B65D 75/26 426/123 |
| 5,882,749 A | | 3/1999 | Jones et al. |
| 5,988,429 A | | 11/1999 | Coe |
| 6,006,913 A | | 12/1999 | Luedemann et al. |
| 6,312,825 B1 | | 11/2001 | Su et al. |
| 6,391,407 B1 | | 5/2002 | Kashiba et al. |
| 6,523,691 B2 | | 2/2003 | Raj et al. |
| 6,623,821 B1 | | 9/2003 | Kendig |
| 6,649,279 B2 | | 11/2003 | Migliorini et al. |
| 7,797,912 B2 | | 9/2010 | Hammond et al. |
| 8,418,871 B1 | | 4/2013 | Amasney |
| 8,479,921 B2 | | 7/2013 | Ingraham |
| 9,694,959 B2 | | 7/2017 | Priscal et al. |
| 9,873,558 B2 | | 1/2018 | Edwards |
| 9,962,913 B2 | | 5/2018 | Osborn et al. |
| 10,562,701 B2 | | 2/2020 | Lee et al. |
| 2002/0103300 A1 | | 8/2002 | Klosiewicz |
| 2004/0016208 A1 | | 1/2004 | Mumpower et al. |
| 2004/0142131 A1 | | 7/2004 | Edwards et al. |
| 2004/0151932 A1 | | 8/2004 | Galloway |
| 2004/0163973 A1 | | 8/2004 | Longo |
| 2004/0251161 A1 | | 12/2004 | Mueller et al. |
| 2005/0186373 A1 | | 8/2005 | Rhee et al. |
| 2009/0324979 A1 | | 12/2009 | Roussel et al. |
| 2010/0243508 A1 | | 9/2010 | Sekiguchi et al. |
| 2011/0005961 A1 | | 1/2011 | Leplatois et al. |
| 2011/0104342 A1 | | 5/2011 | Glaser et al. |
| 2011/0143155 A1 | | 6/2011 | Aubee et al. |
| 2011/0266189 A1 | | 11/2011 | Tom et al. |
| 2012/0021151 A1 | | 1/2012 | Tatarka et al. |
| 2012/0107542 A1 | | 5/2012 | Nelson et al. |
| 2012/0152954 A1 | | 6/2012 | Bruehl et al. |
| 2014/0008368 A1 | | 1/2014 | Severini |
| 2015/0132593 A1 | | 5/2015 | Borse et al. |
| 2015/0251814 A1 | | 9/2015 | Campanelli et al. |
| 2015/0298439 A1 | | 10/2015 | Osborn et al. |
| 2016/0051443 A1 | | 2/2016 | Depla |
| 2016/0066998 A1 | | 3/2016 | Knowlton et al. |
| 2016/0200501 A1 | * | 7/2016 | Lee .......................... B65B 9/042 53/433 |
| 2017/0029189 A1 | | 2/2017 | Sanders et al. |
| 2017/0081099 A1 | | 3/2017 | Priscal et al. |
| 2017/0158400 A1 | | 6/2017 | Priscal et al. |
| 2020/0165045 A1 | | 5/2020 | Kondo et al. |

FOREIGN PATENT DOCUMENTS

| | | |
|---|---|---|
| CN | 102227311 B | 10/2014 |
| EP | 0144239 B1 | 2/1991 |
| EP | 0959020 A1 | 11/1999 |
| EP | 2090527 A1 | 8/2009 |
| EP | 2316644 A2 | 5/2011 |
| EP | 2520615 A1 | 11/2012 |
| EP | 3820697 A1 | 5/2021 |
| JP | 2017100419 A | 6/2017 |
| WO | 1998055537 A1 | 12/1998 |
| WO | 2002074843 A2 | 9/2002 |
| WO | 2007078454 A2 | 7/2007 |
| WO | 2016128865 A1 | 8/2016 |
| WO | 2017106120 A2 | 6/2017 |
| WO | 2018108776 A1 | 6/2018 |
| WO | 2020074688 A1 | 4/2020 |
| WO | 2020204984 A1 | 10/2020 |
| WO | 2020204985 A1 | 10/2020 |
| WO | 2020205061 A1 | 10/2020 |

OTHER PUBLICATIONS

PCT International Search Report, International Application No. PCT/US2020/026642, issued Jun. 22, 2020, 2 pages.

Seven, Karl M., "Nucleating Agents for High Density Polyethylene—A Review", Polymer Engineering and Science, published online in Wiley Online Library (wileylibrary.com), pp. 541-554, 2016.

* cited by examiner

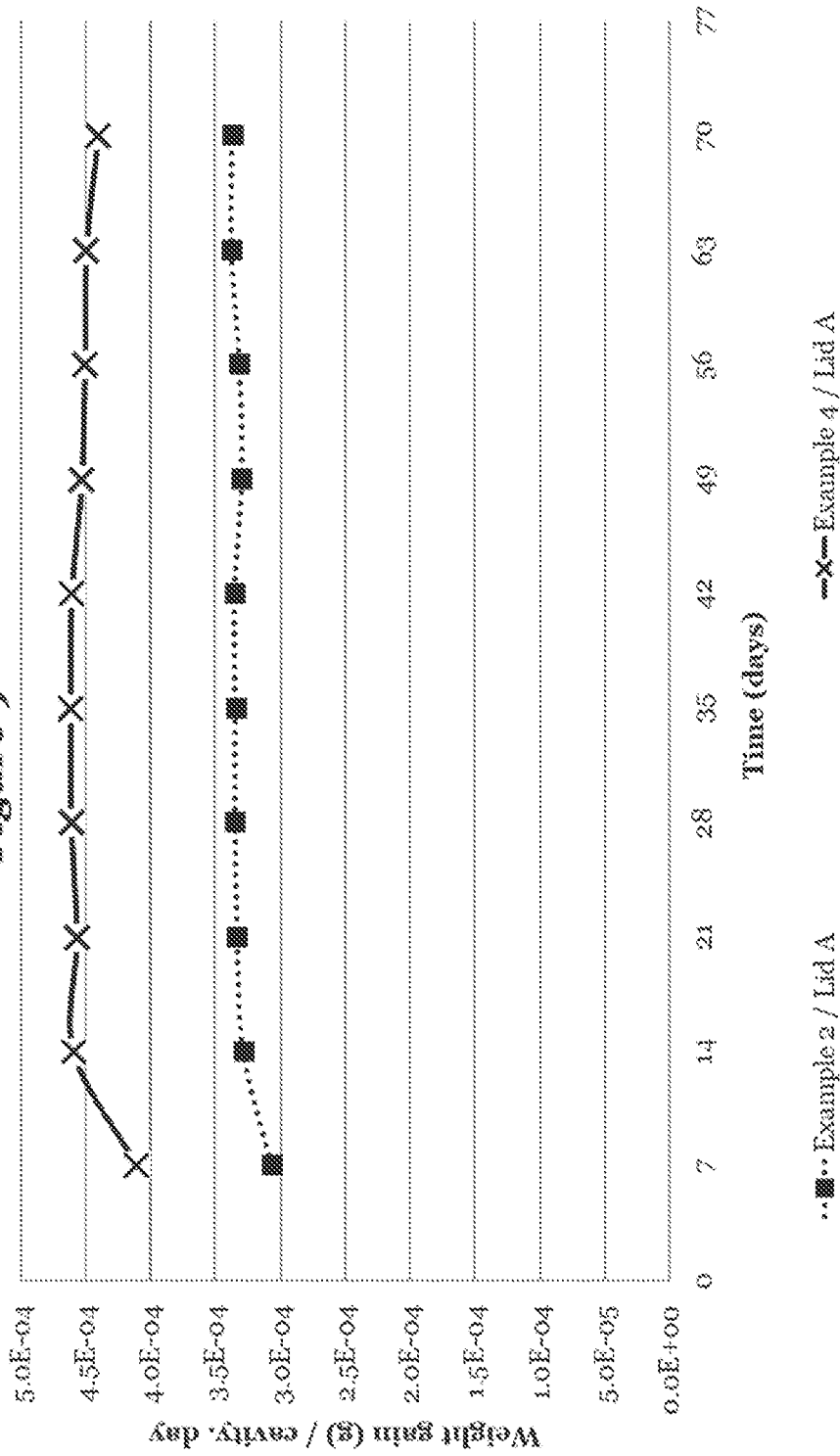

RECYCLABLE FILM FOR THERMOFORMING

TECHNICAL FIELD

This disclosure is related to film structures, in particular high-performance recyclable films that are suitable for thermoforming into packaging components.

BACKGROUND

High-performance packaging films are used to package many products such as food, pharmaceuticals, consumer goods or industrial items. Products that are sensitive to their environment use specially designed packaging to help protect the product and extend the shelf-life to a point in time where a consumer can use the product. Often these packages are made from various types of polymers and additives that offer the properties needed to achieve "high-performance". The materials chosen for the packaging may enhance barrier properties, physical properties or aesthetics, among other things. Usually, the design of the packaging includes multiple materials to achieve several characteristics.

The combination of materials in a single packaging material can create difficulties when determining how to dispose of the packaging after use. Often, recycling is most efficient or may only be possible if the materials in the package are of the same polymer type. Efforts to use recyclable packaging materials, especially those that use a singular polymer type, result in lower performance and/or significantly higher costs. Lower performance characteristics encountered might be visual defects, less barrier and shorter shelf-life, slower speeds on packaging equipment, to name a few.

One polymer type that is particularly suitable for recycling is high-density polyethylene. This material has been used for milk jugs or other bottles for many years. The bottles are 100% high-density polyethylene and provide suitable barrier properties given the thick walls. In many countries, there is a current process in place to collect, sort and recycle these packages.

However, the use of high-density polyethylene as a main component has not translated to most flexible packaging formats. Outside of injection molding or blow molding, high-density polyethylene has drawbacks that make it inefficient to use. For example, in thermoformed flexible packaging, such as trays or cups, it has been found that high-density polyethylene does not form as easily or consistently as other materials, such as polystyrene or PVC. Forming of high-density polyethylene can be slow and result in poorly formed parts. In addition, secondary crystallization of high-density polyethylene can cause the formed parts to warp and curl in the hours and days after forming. For this reason, thermoformed packaging often uses other materials, such as multilayer films with combinations of materials, to achieve good parts at acceptable speeds. These films are not recyclable due to the variety of materials therein.

SUMMARY

The structure and material components of a thermoformed base component are configured to provide moisture barrier, superior forming and heat sealing characteristics, and recyclability options. A thermoformable base film from which the base is formed has high levels of polyethylene such that it is easily recyclable. Surprisingly, the thermoformable films described herein have an acceptable operating window in a thermoforming process. Also advantageous, the final thermoformed base components maintain the original thermoformed shape, resisting warping and shrink.

In various embodiments of this disclosure, a thermoformable base film is described. The thermoformable base film has a first layer having a polyethylene, a second layer having a high-density polyethylene and a hydrocarbon resin, and a third layer having a polyethylene. The second layer is located between the first and third layers. The first and third layers each have an overall density between about 0.92 g/cm$^3$ and 0.97 g/cm$^3$ and each form a surface of the thermoformable base film. The first layer may additionally contain metallocene linear low-density polyethylene. The second layer may additionally contain a nucleating agent.

Additionally, the film may have a fourth layer having a high-density polyethylene and an inorganic particle, located between the first and third layers. The inorganic particle may be calcium carbonate. The inorganic particle may be present at a level of 5% (by weight, relative to the entire fourth layer).

The thermoformable base film may have a melt flow rate that is at least 20% greater than a thermoformable base film that is identical with the exception that the film is free from a hydrocarbon resin.

The film may also have various other layers including, but not limited to, an oxygen barrier layer containing ethylene vinyl alcohol copolymer, or a center layer. If the film has a center layer, the center layer contains an ethylene vinyl acetate copolymer and the film is palindromic. The film may be formulated to have a total composition that is suitable for recycling. To allow for easy recycling, the film may be formulated such that it is essentially free from polyester, ethylene vinyl alcohol copolymer and polyamide. The thermoformable base film has a thermoforming temperature operating window of at least 6° C.

The first layer of the thermoformable base film may have a heat seal strength greater than 2,000 g/25.4 mm when heat sealed to an ethylene vinyl acetate material at conditions of 0.5 seconds and 30 PSI.

Specific embodiments of the thermoformable base include a first layer having a blend of high-density polyethylene and a polyethylene having a density less than 0.93 g/cm$^3$. Specific embodiments of the thermoformable base include a first layer having a medium density polyethylene.

The hydrocarbon resin in the second layer may have a loading level from 5% to 10% by weight with respect to the thermoformable base film the melt index of the thermoformable base film may be between 1.7 and 2.3 g/10 min (190° C., 2160 g).

Another embodiment of the thermoformable base film includes a first layer having an overall density between about 0.92 g/cm$^3$ and 0.97 g/cm$^3$, a second layer having between 60 weight % and 90 weight % high-density polyethylene and between 2.5 weight % and 30 weight % hydrocarbon resin, and a third layer having an overall density between about 0.92 g/cm$^3$ and 0.97 g/cm$^3$. The second layer is located between the first layer and the third layer and has a thickness that is from 25% to 90% of the total thickness of the thermoformable base film. This embodiment may be essentially free from polyester, ethylene vinyl alcohol copolymer and polyamide.

In any embodiments, the overall density of the thermoformable base film is less than 1.0 g/cm$^3$.

In various embodiments of this disclosure, a thermoformed base is described. The thermoformed base is formed from the thermoformable base film and includes at least one cavity and a flange (i.e. unformed area) surrounding each of the cavities. Advantageous to the films described herein, the thermoformed bases maintain the shape taken during the thermoforming process.

In various embodiments of this disclosure, the thermoformed bases described herein are combined with a product and a lid packaging component to create a packaged product. The lid is hermetically sealed to the flange of the base and the product is thereby enclosed in the cavities. The lid may contain metal or paper. The lid may be peelably sealed to the base, such that it can be removed with manual force. The seal strength between the thermoformed base and the lid packaging component may be at least 2,000 g/25.4 mm.

In some embodiments the lid is a "push through" lid. In other words, the cavity of the thermoformed base can be depressed manually and the product is pushed through the lid for dispensing. In preferred embodiments of the packaged product, the lid has a first exterior layer having a high-density polyethylene and an inorganic particle, a second exterior layer having a polyethylene-based material and a first interior layer having a high-density polyethylene and optionally a hydrocarbon resin. In some embodiments of the packaged product, both the base and the lid component are recyclable in the same recycle process.

It has been found that a thermoformable base film as described herein, having at least a first layer, a second layer and a third layer, can be used to produce a thermoformed base packaging component with excellent results. This is surprising as the thermoformable base film contains a high amount of polyethylene which has previously been shown to not have an acceptable combination of properties for high-performance thermoformed packaging applications. The thermoformable base film described herein delivers a critical and previously unachieved combination of 1) thermoforming ease, 2) high moisture barrier and 3) recyclability.

BRIEF DESCRIPTION OF THE DRAWINGS

The disclosure may be more completely understood in consideration of the following detailed description of various embodiments of the disclosure in connection with the accompanying drawings, in which:

FIG. 9 is a chart showing data according to a USP 671(40° C., 75% RH) Weight Gain per Cavity per Day study.

Figure 1:
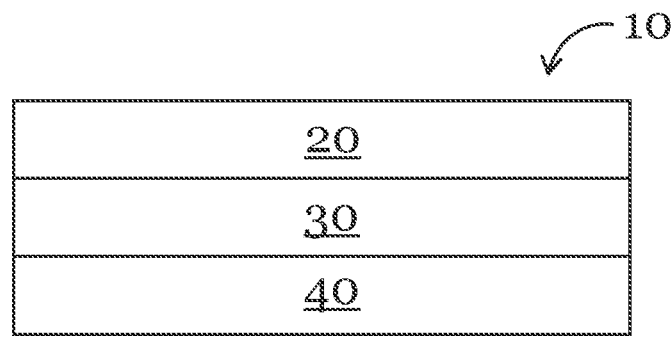
FIG. 1 is a schematic of a cross-section of an embodiment of a thermoformable base film including a first, second and third layer.

The drawings show some but not all embodiments. The elements depicted in the drawings are illustrative and not necessarily to scale, and the same (or similar) reference numbers denote the same (or similar) features throughout the drawings.

DETAILED DESCRIPTION

Described herein is a polyethylene-based, thermoformable base film suitable for packaging products that might be sensitive to oxygen and/or moisture. A lidding film may be heat sealed to a thermoformed base packaging component made from the thermoformable base film, creating a package that may be accepted in a high-density polyethylene recycling process or a polyethylene recycling process. The high-performance packaging may be suitable for products such as, but not limited to, pharmaceuticals, nutraceuticals, medical products, fresh foods, refrigerated foods, shelf-stable foods, consumer goods, cosmetics and chemicals.

The structure and material components of the thermoformed base component are uniquely configured to provide moisture barrier, good clarity, and recyclability options. Surprisingly, the thermoformable films described herein have an acceptable operating window in a thermoforming process such that the final thermoformed base components are easily thermoformed. Also surprising is that upon thermoforming, the thermoformable base materials described herein are able to maintain the original thermoformed shape, resisting warping and shrink.

The packages described herein, incorporate at least two packaging components. First is a thermoformed base component with at least one thermoformed cavity, made from a polyethylene-based film. The thermoformed cavity may be deep or shallow and is generally shaped to hold the intended product therein. The thermoformable base film should be of a thickness to provide for the desired rigidity (i.e. stiffness), durability and barrier upon thermoforming. Second is a lid packaging component. The lid is configured from a film that is capable of being hermetically heat sealed to the thermoformed base component, producing a protective package for the product.

In some embodiments of the package, a high-performance lid component having a composition high in high-density polyethylene may be used in conjunction with the thermoformed base. The combination of the thermoformed base component and the lid packaging component provides for superior package characteristics while keeping a highly homogeneous polymer composition (essentially comprising polyethylene) to provide for the opportunity to recycle the entire package in a single stream, such as the high-density polyethylene bottle stream.

The packaging components described herein are unique in that they are produced using high levels of high-density polyethylene, yet retain high-performance characteristics required for demanding packaging applications. The hermetically sealed packages provide excellent product protection (i.e. moisture barrier), good appearance, good forming accuracy and consistency, good heat resistance, and good seal strength. Packages with these levels of performance have not previously been delivered using materials that can be easily recycled in the high-density recycling stream.

Base Packaging Component

The thermoformed base packaging component is formed from a thermoformable base film 10 that has at least a first layer 20, a second layer 30 and a third layer 40, with the second layer positioned between the first and third layers, as shown in FIG. 1. The first and third layers may have a similar or identical composition and together make up about 10% to about 35% of the overall thickness (or volume) of the thermoformable base film. The second layer makes up about 25% to about 90% of the thermoformable base film. In some embodiments of the thermoformable base film, the second layer makes up about 50% to about 90% of the thermoformable base film. There may be additional layers in the thermoformable base film as well.

The term "layer", as used herein, refers to a building block of films that is a structure of a single material type or a homogeneous blend of materials. Films contain one or more layers that are connected to each other. A layer may contain a single polymer, a blend of materials within a single polymer type (i.e. polyethylene) or a blend of various polymer types. A layer may contain metallic materials or other non-polymer materials and may have additives. Layers may be continuous with the film or may be discontinuous or patterned in comparison to the film. A film has two surfaces, opposite each other. The layer at the surface of a film is not connected to another layer of that film at that surface.

The first and third layers of the thermoformable base film each contain a polyethylene and have an overall density between about 0.92 g/cm$^3$ and 0.97 g/cm$^3$. The first and third layers may contain a high-density polyethylene, a medium-density polyethylene or a blend of one of these with a lower density polyethylene. As used throughout this application, the term "high-density polyethylene" or "HDPE" refers to both (a) homopolymers of ethylene which have densities from about 0.960 g/cm$^3$ to about 0.970 g/cm$^3$ and (b) copolymers of ethylene and an alpha-olefin (usually i-butene or i-hexene) which have densities from about 0.940 g/cm$^3$ to about 0.958 g/cm$^3$. High-density polyethylene includes polymers made with Ziegler or Phillips type catalysts and polymers made with single site metallocene catalysts. The high-density polyethylene may be bimodal and may be pre-nucleated with a nucleating agent. A nucleating agent may be added to the HDPE by masterbatch. As used throughout this application the term "medium-density polyethylene" refers to homopolymers and copolymers of ethylene having a density from about 0.926 and 0.940 g/cm$^3$.

As used throughout this application, the term "nucleating agent" refers to an additive that forms nuclei in a polymer melt to control the growth of crystals. The nucleating agent can be any of the type that is capable of nucleating high-density polyethylene and may be added at the point of polymerization of the high-density polyethylene or at a later point in time by way of the addition of and melt blending a nucleating agent containing masterbatch. Examples of nucleation additives include minerals such as chalk, talc, clay, kaolin, silicates and the like, and organic agents such as salts of aliphatic or aromatic carboxylic acids, aromatic salts, metallic salts of aromatic phosphorous compounds, quinaridones, and aromatic amides. Further examples of nucleating agents include zinc glycerolate, calcium glycerolate, calcium hexahydrophthalate, zinc hexahydrophthalate, salts and the like, and mixtures thereof. The nucleating agent may be present in the first and third layers of the thermoformable base film at a level from 0% to about 3.5% by weight of the layer.

Examples of pre-nucleated high-density polyethylene materials that may be suitable for the thermoformable base film are Grade M6020SB available from Equistar and HPS167AB available from Nova Chemicals. An example of un-nucleated high-density polyethylene materials that may be suitable of the thermoformable base film is Grade M6020 available from Equistar. Examples of nucleating agent masterbatch materials that may be suitable for the thermoformable base film are Hyperform® HPN nucleating agents available from Milliken.

The first and third layer may also contain a polyethylene having a density less than 0.93 g/cm$^3$. For example, the first layer may contain a linear low-density polyethylene, a metallocene catalyzed linear low-density polyethylene, an ethylene-based plastomer or low-density polyethylene having a density of about 0.92 g/cm$^3$. The polyethylene having a density less than 0.93 g/cm$^3$ may be blended with a high- or medium-density polyethylene and may be present in the layer at an amount greater than 0.5%, an amount greater than 5%, an amount greater than 10%, or about 30% or more, by weight. Two or more different polyethylene materials having a density less than 0.93 g/cm$^3$ may be used in the first layer. The first and third layers may have the same or different composition.

As used herein, a "polyethylene having a density less than 0.93 g/cm$^3$" is a homopolymer or copolymer of ethylene having a density lower than medium-density polyethylene, thus having significantly different physical properties. The density of the polyethylene is ideally between 0.88 g/cm$^3$ and 0.93 g/cm$^3$. The polyethylene having a density less than 0.93 g/cm$^3$ may be an ethylene-based plastomer or a metallocene catalyzed linear low-density polyethylene. Examples of polyethylene having a density less than 0.93 g/cm$^3$ that are useful for the thermoformable base film include ATTANE™ 4701 ultra-low density polyethylene (density 0.913 g/cm$^3$, melt index 1.0 g/10 min, Vicat softening temperature 94.0° C., available from Dow Chemical), Exceed™ 1018 metallocene catalyzed ethylene-hexene copolymer (density 0.918 g/cm$^3$, melt index 1.0 g/10 min, melt temperature 119° C., available from ExxonMobil), AFFINITY™ PL1850 ethylene-based plastomer (density 0.902 g/cm$^3$, melt index 3.0 g/10 min, seal initiation temperature 94.0° C., available from Dow Chemical), Exact™ 3139 ethylene-based plastomer (density 0.900 g/cm$^3$, melt index 7.5 g/10 min, Vicat softening temperature 80.0° C., melt temperature 95.0° C., available from ExxonMobil) and DOW™ LDPE 608A low-density polyethylene (density 0.023 g/cm$^3$, melt index 2.6 g/10 min, Vicat softening temperature 97.2° C., melt temperature 113° C., available from Dow Chemical). The polyethylene having a density less than 0.93 g/cm$^3$ in the first layer should have a softening point that allows for lower temperature heat sealing when another packaging component is attached (i.e. a lid is heat sealed).

The first and third layers may have the identical, similar or different composition regarding the type of polyethylene, the type and presence of nucleating agent, the overall density of the layer and the blend ratio of the materials. The first and third layers may have identical, similar or different thickness.

The second layer of the thermoformable base film contains a high-density polyethylene and a hydrocarbon resin. In some embodiments, the second layer of the thermoformable base film contains a nucleating agent. The second layer may be split into multiple "second layers" which may be separated by other layers. The single or multiple second layers must be between the first and the third layers.

The high-density polyethylene should be present in the second layer at an amount of about 60% to about 90%, by weight. The high-density polyethylene may be present in the second layer at an amount greater than 80% or an amount greater than 85%. Two or more different high-density polyethylene materials may be present in the second layer. A nucleating agent may be present in the second layer of the thermoformable base film at a level from about 0.2% to about 3.5% by weight of the layer.

As used herein, the phrase "hydrocarbon resin" refers to a low molecular weight product (molecular weight less than about 10,000 Daltons) produced by polymerization from coal tar, petroleum, and turpentine feed stocks. A hydrocarbon resin may comprise any of those hydrocarbon resins disclosed in U.S. Pat. No. 6,432,496, issued Aug. 13, 2002, or in U.S. Patent Application 2008/0286547, published Nov. 20, 2008, both of which are incorporated in their entireties in this application by this reference. More specifically, as a non-limiting example, the hydrocarbon resin may include petroleum resins, terpene resins, styrene resins, cyclopentadiene resins, saturated alicyclic resins or mixtures of such resins. Additionally, as a non-limiting example, the hydrocarbon resin may comprise hydrocarbon resin derived from the polymerization of olefin feeds rich in dicyclopentadiene (DCPD), from the polymerization of olefin feeds produced in the petroleum cracking process (such as crude C9 feed streams), from the polymerization of pure monomers (such as styrene, α-methylstyrene, 4-methylstyrene, vinyltoluene or any combination of these or similar pure monomer feedstocks), from the polymerization of terpene olefins (such as α-pinene, β-pinene or d-limonene) or from a combination of such. The hydrocarbon resin may be fully or partially hydrogenated. Specific examples of hydrocarbon resins include but are not limited to Plastolyn® R1140 Hydrocarbon Resin available from Eastman Chemical Company (Kingsport, Tenn.), Regalite® T1140 available from Eastman Chemical Company (Kingsport, Tenn.), Arkon® P-140 available from Arakawa Chemical Industries, Limited (Osaka, Japan) and Piccolyte® 5135 Polyterpene Resins available from Hercules Incorporated (Wilmington, Del.).

The hydrocarbon resin may be present in the second layer at an amount between 0% and 50%, by weight. The upper limit of hydrocarbon resin used may be dictated by processing issues (i.e. insufficient melt strength during extrusion) or film properties. For example, high levels of hydrocarbon resin may cause interlayer adhesion problems or film brittleness. The amount of hydrocarbon used in the second layer will also depend on the type of hydrocarbon resin used and the thickness of the second layer. For example, a thinner second layer may be able to be processed with a higher level of hydrocarbon resin before issues are encountered.

In some embodiments of the thermoformable base film, the hydrocarbon resin may be present at a level up to 30%, by weight relative to the second layer. The hydrocarbon resin may be loaded into the second layer at a level between 2.5% and 30%. Some embodiments of the thermoformable film will have hydrocarbon resin levels in the second layer between 5% and 20%. In exemplary embodiments, the hydrocarbon resin is present at an amount of about 15% or about 7.5%, by weight. The level of hydrocarbon resin may be adjusted to control both the moisture barrier properties of the film and the thermoforming temperature window. Increasing the hydrocarbon resin level increases the moisture barrier properties of the film. Increasing the hydrocarbon resin level increases (i.e. widens) the thermoforming temperature window of the thermoformable base film.

Any additional materials present in either the first, second or third layers of the thermoformable base film, or present in other layers of the thermoformable base film should be acceptable to the polyethylene recycling process. The thermoformable base film may have an overall density less than 1.0 g/cm$^3$ for separation purposes. Any additional non-polyethylene materials may be present at a low level such that they do not disrupt or otherwise hamper the recycling process. The additional materials may be of a type that is acceptable to the recycling process, such as other types of polyolefin-based materials. The additional materials may be present along with a compatibilizer system.

Other layers may be present in the thermoformable base film, as long as these layers are not detrimental to the properties of the film (i.e. the materials must be acceptable to the polyethylene recycling process). Other layers may be present at any location of the thermoformable base film.

Figure 2:
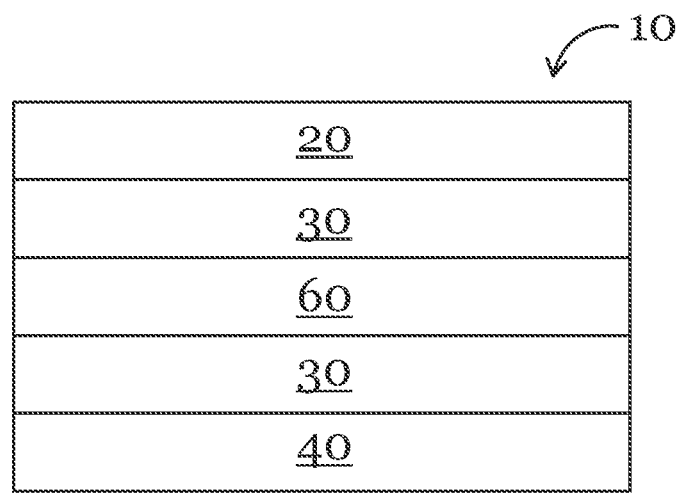
FIG. 2 is a schematic of a cross-section of an embodiment of a thermoformable base film including a first layer, a split second layer, a third layer and a center layer.

For example, the thermoformable base film may have a center layer. As used herein, a "center" layer is one that has an equal number of layers on either side of the center layer in a given film. FIG. 2 shows an embodiment of the thermoformable base film 10 with a first layer 20 forming the surface of the thermoformable base film, a third layer 40 forming the opposite surface of the thermoformable base film, two second layers 30 that are split and are separated by a center layer 60. In this example, the center layer has two layers on either side, and thus it is in the center of the thermoformable base film. The center layer may have any composition as described herein, such as having an oxygen barrier material or a tie material.

A center layer 60 is particularly useful when the thermoformable base film is produced by way of a "collapsed bubble" process. During this process, a multilayer film is produced by an annular coextrusion process and the tube is subsequently collapsed upon itself, combining the two sides into one final film. This process results in a palindromic layer structure, and the layer that is in the center contains a material that will bond to itself under warm conditions, such as ethylene vinyl acetate copolymer. Thermoformable base films made from this process necessarily have a first layer and a third layer that have identical thickness and composition. Thermoformable base films made from this process necessarily have a center layer. Thermoformable base films made from this process necessarily have at least two second layers.

Figures 3, 4:
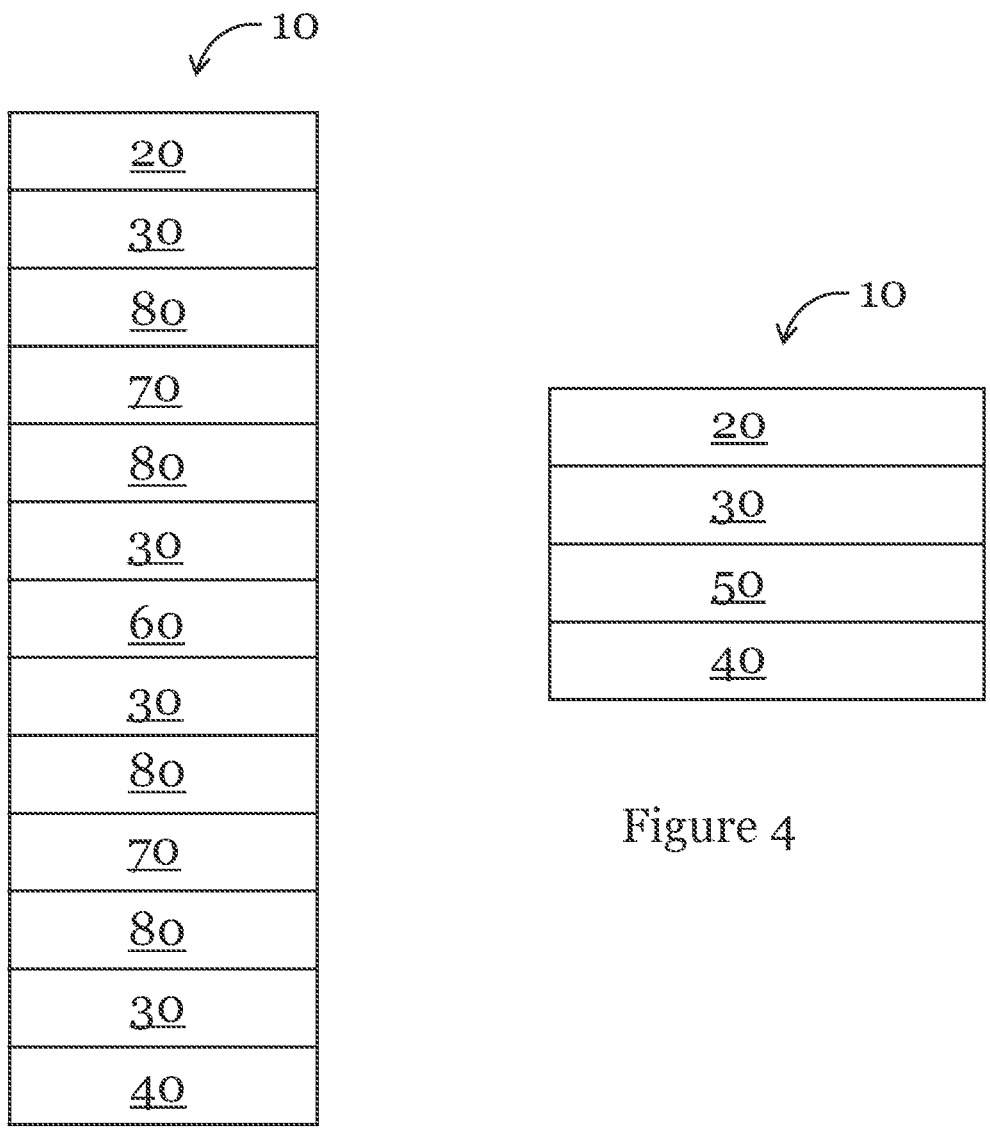
FIG. 3 is a schematic of a cross-section of an embodiment of a thermoformable base film including a first layer, a second layer, a third layer, a center layer and an oxygen barrier layer.
FIG. 4 is a schematic of a cross-section of an embodiment of a thermoformable base film including a first, second, third and fourth layer.

In some thermoformable base films, such as the embodiment shown in FIG. 3, one or more oxygen barrier layers may be present. The oxygen barrier layer should be between the first layer and the third layer. The oxygen barrier layer contains a material that is known to limit the transmission of oxygen through the film. One choice for an oxygen barrier material is EVOH. In some cases, EVOH may be present along with a compatibilizer that allows EVOH to be incorporated into the polyethylene recycling stream.

As used herein, "EVOH" refers to ethylene vinyl alcohol copolymer. EVOH is otherwise known as saponified or hydrolyzed ethylene vinyl acetate copolymer and refers to a vinyl alcohol copolymer having an ethylene comonomer. EVOH is prepared by the hydrolysis (or saponification) of an ethylene-vinyl acetate copolymer. EVOH is commercially available in resin form with various percentages of ethylene. Preferably, ethylene/vinyl alcohol copolymers comprise from about 27-48 mole % ethylene, or even 27-38 mole % ethylene.

FIG. 3 shows an embodiment of the thermoformable base film 10 that has a combination of options, including a first layer 20, a third layer 40, four second layers 30, a center layer 60, two oxygen barrier layers 70 and four tie layers 80. This embodiment could be produced by a collapsed bubble process, in which case the film is palindromic. Alternately, the film could be produced by a different process and the film is then not necessarily palindromic. Tie layers 80 are used in this embodiment and may be introduced into any other embodiment of the thermoformable base film. Tie layers are layers with the purpose of bonding dissimilar layers, in this case an oxygen barrier layer and a second layer. The need for tie layers is dependent upon the materials in the adjacent layers. For the embodiments of the thermoformable base film described herein, tie layers based on polyethylene copolymers are typically suitable.

As shown in FIG. 4, the thermoformable base film 10 may have a fourth layer 50 having high-density polyethylene with an inorganic particle, such as calcium carbonate or talc. The addition of one or more fourth layers may assist in achieving clean cutting of the material after thermoforming. The one or more of the fourth layers 50 should be located between the first layer 20 and the third layer 40 of the thermoformable base film 10. The inorganic particle should be present in the fourth layer in amounts of at least 5% or between 5% and 30%, by weight. Care should be taken in the addition of inorganic particles regarding significant increases in the overall density of the thermoformable base film. The overall density of the thermoformable base sheet should remain below 1.0 g/cm$^3$ as this is a critical feature used in separation procedures during the recycling process (i.e. sorting by floating).

In some embodiments of the thermoformable base film, either the first or third layer forms the surface of the film. This surface may become the surface to which a lid component is heat sealed to a thermoformed base made of the thermoformable base film. In this arrangement, the lid is heat sealed to the first layer that contains a polyethylene and has a density between about 0.92 g/cm$^3$ and 0.97 g/cm$^3$.

The thermoformable base film may be fully coextruded or may be produced by other processes such as lamination or coating.

Overall, the thermoformable base film may have a thickness from about 4 mil (102 micron) to about 80 mil (2,032 micron). Some packaging applications would benefit from a thermoformable base film that has a thickness from about 8 mil (203 micron) to about 50 mil (1,270 micron). In some embodiments, the thermoformable base film has a thickness from about 8 mil (203 micron) to about 25 mil (635 micron).

The thermoformable base film should have a total composition suitable for recycling. The thermoformable base film should have a total composition suitable for recycling in a process that typically accepts polyethylene-based materials. The total composition may be suitable for recycling in a process that accepts high-density polyethylene materials.

The thermoformable base films described herein may be recycled after their primary use is completed. As used herein, the term "suitable for recycling" is meant to indicate that the film can be converted into a new useful item, by means of reprocessing in a polyolefin recycle stream (i.e. recycling streams based on polyethylene). Reprocessing may entail washing, separating, melting and forming, among many other steps. Typically, when plastic packaging is recycled by reprocessing, the material is mechanically chopped into small pieces, melted, mixed and reformed into the new product. If multiple incompatible materials are present in the packaging, interactions occur during reprocessing causing gels, brittle material, poor appearance and generally un-usable or poor-quality products. Using the term "recyclable" indicates that these drawbacks are generally not present. Qualification as a recyclable material is not regulated by any specific agencies but can be obtained from specific groups such as Association of Plastic Recyclers (APR) and How2Recycle™. Recyclable films disclosed herein may be suitable for high-density polyethylene-based recycling streams. Introduction of a recyclable film into any of these recycling-by-reprocessing avenues should not require additional compatibilizer.

Being suitable for recycling may be obtained by keeping the overall amount of polyethylene in the total composition of the thermoformable base film at a high level. Any additives used should be kept to a minimum. Any non-polyethylene-based polymers present should be minimized or may be accompanied by compatibilizers to achieve a composition suitable for recycling. The overall density of the thermoformable base film should be maintained below 1.0 g/cm$^3$.

To further efforts to achieve a total composition that is suitable for recycling, some embodiments of the thermoformable base film are free from polyester materials. Polyester materials are typically used in films because of the thermoforming ease, stiffness and clarity. However, the presence of polyester may greatly hinder the recyclability of the film.

To further efforts to achieve a total composition that is suitable for recycling, some embodiments of the thermoformable base film are free from EVOH materials. EVOH is typically used in films because it is a thermoformable oxygen barrier material. However, the presence of EVOH may greatly hinder the recyclability of the film.

To further efforts to achieve a total composition that is suitable for recycling, some embodiments of the thermoformable base film are free from polyamide materials. Polyamide materials are typically used because of the thermoforming ease, durability and stiffness. However, the presence of polyamide may greatly hinder the recyclability of the film.

The thermoformable base film may be free from polyester, EVOH and polyamide. The thermoformable base film may be free from fiber-based materials.

It has been found that a thermoformable base film as described herein, having at least a first layer, a second layer and a third layer, can be used to produce a thermoformed base packaging component with excellent results. This is surprising as the thermoformable base film contains a high amount of polyethylene which has previously been shown to not have an acceptable combination of properties for high-performance thermoformed packaging applications. The thermoformable base film described herein delivers a critical and previously unachieved combination of 1) thermoforming ease, 2) high moisture barrier and 3) recyclability.

Most surprising is the thermoforming characteristics of the thermoformable base films described herein. Thermoforming is a process by which a film is heated above a minimum temperature to soften the polymers to a point where they can be physically formed into a desired shape, and below a maximum temperature where the film is melting and cannot be web processed. Film or sheet structures that contain high-density polyethylene materials are notoriously known for having a very narrow temperature window (delta between the minimum and maximum processing temperatures) for thermoforming. The thermoformable base films that contain a second layer using a hydrocarbon resin as described herein may increase the thermoforming temperature window by up to 100% or even 200% over films that do not contain a hydrocarbon resin in the second layer. Even small amounts of hydrocarbon resin (i.e. 2.5%) in the second layer of the thermoformable film can have a significant impact on the ease with which the film can be thermoformed due to the more forgiving temperature range for forming.

Also surprising is that the thermoformable base films described herein, while having high levels of polyethylene, maintain the shape taken during thermoforming. In other words, the thermoformed bases produced from the thermoformable base film can be thermoformed without experiencing post-thermoforming warping or curling. Additionally, any shrinking that may happen after thermoforming is also greatly reduced or eliminated. This result is contrary to previously thermoformed films containing high-density polyethylene.

The thermoformable base films advantageously have excellent moisture barrier. The moisture barrier property is dependent on the layer composition. One way to increase the moisture barrier is to increase the amount of hydrocarbon resin or nucleating agent in the second layer. Another way to increase the moisture barrier is to use a bimodal high-density polyethylene. The moisture barrier performance of the thermoformable base film is important as it allows this material to replace other standard forming films which may not be easily recyclable, such as PVC, for packaging moisture sensitive products.

Packaged Product

The thermoformable base films may be formed into packaging components (thermoformed bases) and used in conjunction with other packaging components (such as lidding) to produce packaging. Thermoformed bases may be produced from the thermoformable base film by a thermoforming process using heat and pressure (mechanical and/or vacuum). The thermoformed base may be highly rigid and inflexible or the thermoformed base may be flexible while still maintaining the thermoformed shape. The thermoformed bases described herein have at least one cavity to hold a product and a flange surrounding each of the cavities. The flange is generally an unformed area of the film and serves as a place to connect the thermoformed base to the other packaging components, which may be a lid, another thermoformed base component or some other packaging component.

Figure 5:
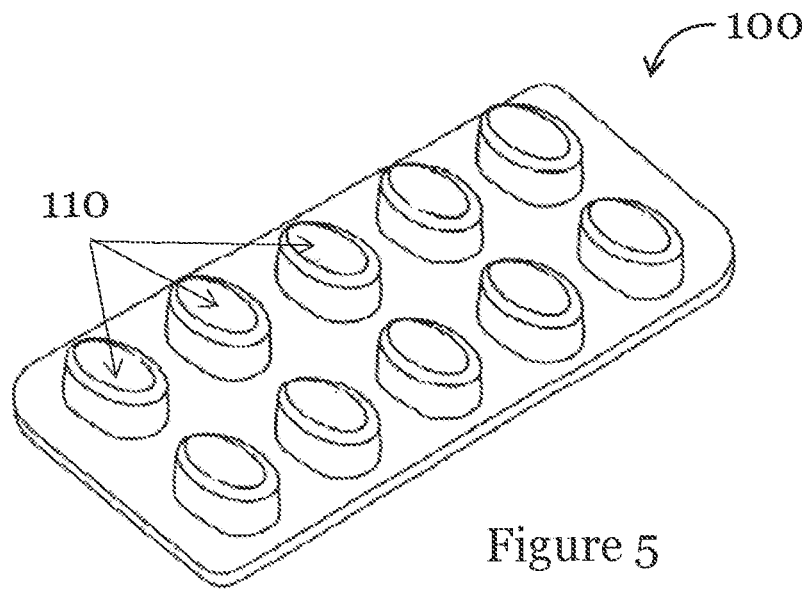
FIG. 5 is a perspective view of thermoformed base component including 10 cavities.
Figure 6:
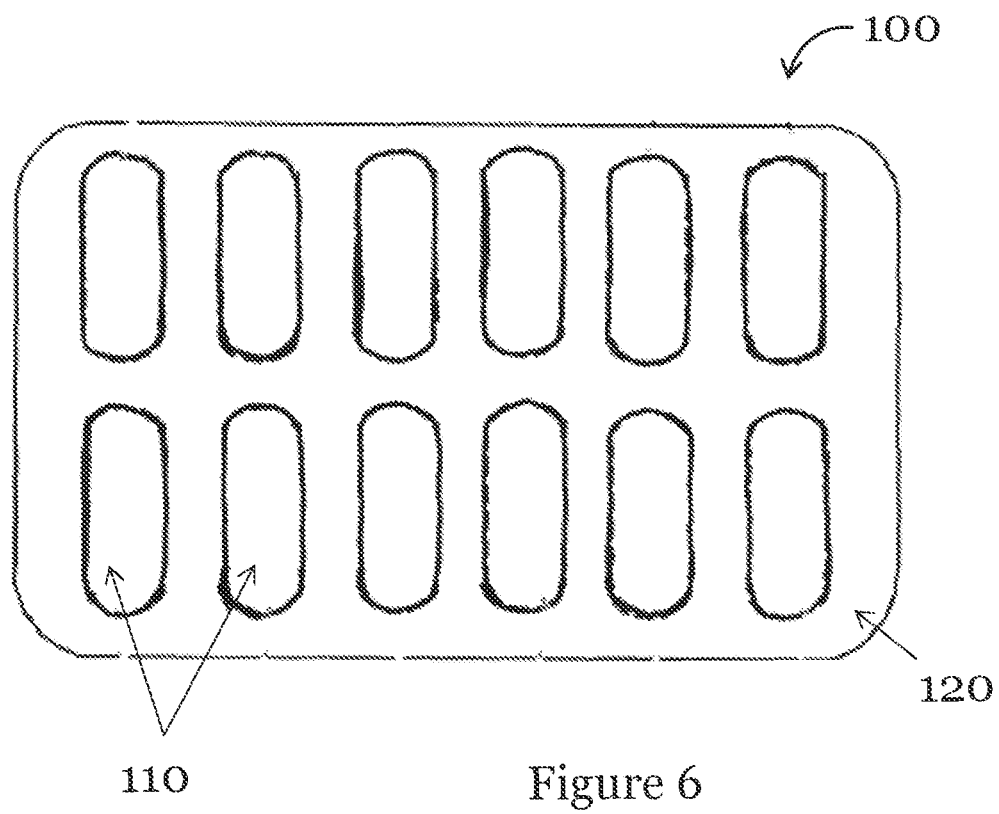
FIG. 6 is a top view of a thermoformed base component showing 12 cavities and a flange.
Figure 7:
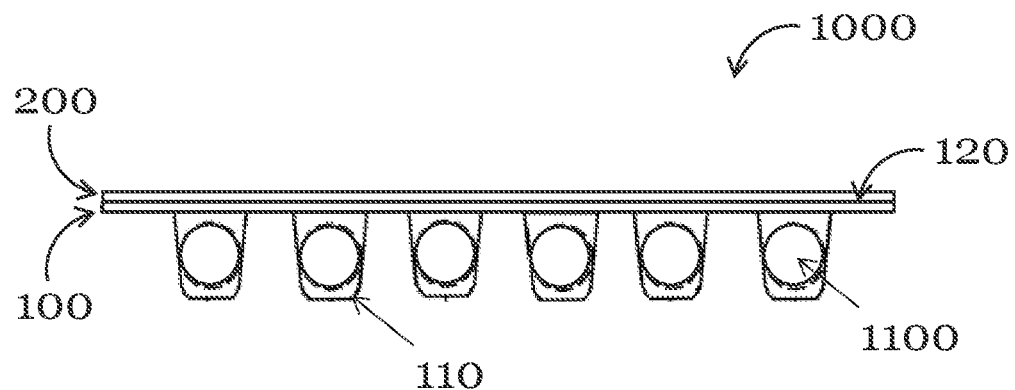
FIG. 7 is a schematic of a cross-section of a package including a thermoformed base component, a product and a lid component.

Examples of thermoformed bases are shown in FIGS. 5-7. In these embodiments the thermoformed bases 100 have multiple (10 or 12) small cavities 110 surrounded by a flange 120. Cavities such as these may be sized specifically to hold an individual pharmaceutical tablet or capsule. Alternatively, the cavity of the thermoformed base may be large and hold multiple product pieces. Cavities of all numbers, sizes and shapes are anticipated by this application.

Each cavity 110 present is surrounded by a flange 120, as shown in the packaged product embodiment of FIG. 7. The flange 120 of the thermoformed base 100 should be an area without curvature for attachment to another packaging component, such as a lid packaging component 200. There is a product 1100 enclosed in each of the cavities. In this embodiment, the lid component is hermetically sealed to the flange in areas surrounding each of the cavities of the thermoformed base. Alternatively, the lidding may be connected to the thermoformed base at the flange in an area including the entire perimeter surrounding all the cavities, and not between each of the cavities.

The thermoformed base may be attached to another packaging component by way of a seal, preferably a hermetic seal. In this manner, the product inside the package is completely enclosed in the cavity and protected by way of the thermoformed base and the other packaging component(s). The exchange of gasses, liquids, microbes or other materials is limited to those that are able to pass through the packaging components, as the hermetic seal does not permit passage in the space between the components.

The product that is contained in the cavities of the thermoformed base is not limited. The package may contain a product that is sensitive to the environment, such as pharmaceuticals or foods. The product may require physical protection, such as delicate medical devices. The product may need to be contained for consumer protection, such as medicaments or cleaners that should be in child proof packaging. The product may be suitable for easy dispensing such as gum or candy.

If a lid packaging component is included in the packaged product, the lid may be of any composition that is suitable for the application. The lid should have a heat sealable exterior layer that is formulated such that it can be readily attached to the thermoformed base by way of heat sealing. The seal between the lid packaging component and the thermoformed base may be peelable (i.e. readily separated manually, peel strength less than about 2,500 g/25.4 mm) or fusion.

If the lid is fusion sealed to the thermoformed base, the lid may be formulated and/or designed such that the product can be pushed through the lid for dispensing. Particularly for applications of a packaged product that include pharmaceutical tablets, gum pieces or the like, the cavities of the thermoformed base may flexible enough that a consumer can depress the cavity manually, forcing the product through the lid component, for dispensing. The seal strength between the thermoformed base and the lid packaging component may be at least 2,000 g/25.4 mm.

The lid packaging component should have a moisture and/or oxygen barrier that is similar in performance to the thermoformed base. Materials that are commonly used in high-performance lidding include but are not limited to metal layers or paper layers. The metal and/or paper layers may be laminated or otherwise connected to polymer layers including a heat-sealing layer. The lid may be printed, scored or otherwise modified for specific properties.

Figure 8:
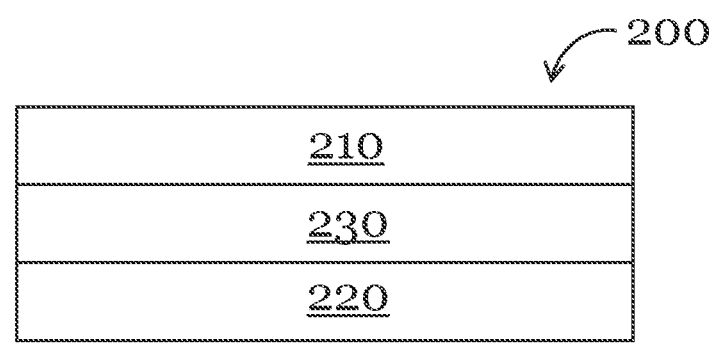
FIG. 8 is a schematic of a cross-section of an embodiment of a lid component for a packaged product.

One example of a lid component that may be sealed to a thermoformed base to provide a packaged product is shown in FIG. 8. The lid 200 may have a first exterior layer 210 containing high-density polyethylene and an inorganic particle, such as talc or calcium carbonate. This type of exterior layer provides high heat resistance during the process of sealing the lid component to the thermoformed base component to enclose the product. The lid may have a second exterior layer 220 that has a polyethylene-base material, formulated to heat seal to the thermoformed base at relatively low temperatures. The lid may have a first interior layer 230 formulated to have excellent moisture barrier. An example of a blend of materials that may work well as a moisture barrier layer is high-density polyethylene and a hydrocarbon resin. This blend is similar to the second layer of the thermoformable base component. One advantage to the lid as shown in FIG. 8 is that it would have similar recyclability as compared to the thermoformable base films described herein, such that the entire package could be recycled together without separating. In some embodiments, the entire package, including a thermoformed base and a lidding component, could be recycled together in a high-density polyethylene recycling process or another polyethylene recycling process.

Examples and Data

Improvement of Temperature Window for Thermoforming

As compared to previously known polyethylene-based films, the structures discussed herein have the distinct advantage in ease of thermoforming. The base packaging components formed from the base packaging film disclosed herein maintain the shape to which they are formed, without warpage due to crystallization of the polymer. The thermoformed parts keep the same dimension and shape in the minutes, hours, days and weeks after thermoforming. Additionally, thermoforming of the material is easier, as there is a wider operating window (i.e. temperature) for forming.

Generally, the thermoforming process is best carried out when the film is heated to a temperature between the softening temperature and the melting temperature for the polymer. In the case of high-density polyethylene, this temperature window for thermoforming is usually quite small—a few degrees. This makes the process of thermoforming standard high-density polyethylene films very difficult to control. It has been found that the base packaging films described herein have a much wider temperature operating window for thermoforming, being able to be softened at a lower temperature and without displaying sagging. As used herein, the "thermoforming temperature operating window" can be defined by the difference between the minimum heating temperature and the maximum heating temperature in the forming process described below.

Additionally, high-density polyethylene-based films have been known to display secondary crystallization, causing significant part shrinkage and warping at time spans of minutes, hours or days after thermoforming. The thermoformable base packaging films described herein do not suffer from this secondary crystallization phenomena, thus allowing for the use of the materials in thermoforming of critical parts such as packaging blisters.

Thermoformable base films Example 1, Example 2 and Comparative Example 1 were manufactured using a standard blown film coextrusion process, collapsing the bubble into a single palindromic film. The details of these films are shown in Table 1 and the structure is shown in FIG. 2. Example 1 contains a first layer having a high-density polyethylene and a nucleating agent, a second layer containing a high-density polyethylene, a hydrocarbon resin and a nucleating agent and a third layer containing a high-density polyethylene and a nucleating agent. Due to the collapsed bubble process used to manufacture the films, the second layer is split into two layers, separated by center layer containing ethylene vinyl acetate copolymer. Also, necessarily, the first layer and the third layer have identical composition. Example 2 and Comparative Example 1 were similarly processed. The second layer of Comparative Example 1 contains no hydrocarbon resin, the second layer of Example 1 contains approximately 7.5% hydrocarbon resin (18.75% loading of a 40% masterbatch) by weight and the second layer of Example 2 contains approximately 15% hydrocarbon resin (37.5% loading of a 40% masterbatch) by weight.

Thermoformable base films Example 1, Example 2 and Comparative Example 1 were run as the forming web on an Uhlmann Blister machine B 1240. The Uhlmann was used to thermoform ten cavities in the thermoformable base film (as shown in FIG. 5). The tooling used created cavities sized to fit a size zero (0) capsule. The material was cycled through the thermoforming process at a rate of 35 cycles/minute. The Uhlmann used top and bottom contact heating in three indexes prior to forming.

In order to evaluate the temperature window for forming proper cavities, the contact heating temperature was slowly ramped up and the formed pockets were evaluated at each temperature. It was found that for Comparative Example 1, the minimum heating temperature required to achieve completely formed pockets was 112° C. Testers considered the cavities to have complete forming when there was evidence of the vacuum ports on the surface of the cavity. For Comparative Example 1 the maximum heating temperature of 115° C. was determined when the material began to melt, deform and have poor aesthetics. Thus, this material has a temperature window of about 3° C. for thermoforming good cavities.

Example 1 thermoformable base was tested in the same method as Comparative Example 1. It was found that the minimum temperature was 109° C. and the maximum temperature was 115° C. This is a temperature operating window of 6° C., a 100% improvement over the Comparative Example 1 thermoformable base. Example 2 thermoformable base was tested in the same method as Comparative Example 1. It was found that the minimum temperature was 106° C. and the maximum temperature was 115° C. This is a temperature operating window of 9° C., a 200% improvement over the Comparative Example 1 thermoformable base.

TABLE 1

Thermoformable Base Film Details

| Base Film Layer (see FIG. 2) | Example 1 | | Example 2 | | Comparative Example 1 | |
|---|---|---|---|---|---|---|
| | Layer % (by mass) | Layer Components | Layer % (by mass) | Layer Components | Layer % (by mass) | Layer Components |
| 1 (first layer) | 12.45 | 99% HDPE1 1% Nuc MB | 12.435 | 99% HDPE1 1% Nuc MB | 12.465 | 99% HDPE1 1% Nuc MB |
| 2 (second layer) | 33.9 | 80.25% HDPE3 18.75% HC MB 1% Nuc MB | 33.9 | 61.5% HDPE3 37.5% HC MB 1% Nuc MB | 33.875 | 99% HDPE1 1% Nuc MB |
| 3 (center layer) | 7.3 | 50% EVA1 50% EVA2 | 7.33 | 50% EVA1 50% EVA2 | 7.32 | 50% EVA1 50% EVA2 |
| 4 (second layer) | 33.9 | 80.25% HDPE3 18.75% HC MB 1% Nuc MB | 33.9 | 61.5% HDPE3 37.5% HC MB 1% Nuc MB | 33.875 | 99% HDPE1 1% Nuc MB |
| 5 (third layer) | 12.45 | 99% HDPE1 1% Nuc MB | 12.435 | 99% HDPE1 1% Nuc MB | 12.465 | 99% HDPE1 1% Nuc MB |

TABLE 1-continued

Thermoformable Base Film Details

| Base Film Layer (see FIG. 2) | Example 1 | | Example 2 | | Comparative Example 1 | |
|---|---|---|---|---|---|---|
| | Layer % (by mass) | Layer Components | Layer % (by mass) | Layer Components | Layer % (by mass) | Layer Components |
| Film Thickness | 15 mil (381 micron) | | 15 mil (381 micron) | | 15 mil (381 micron) | |
| Flat film MVTR[2] | 0.0095 g/100 in²/day | | 0.006 g/100 in²/day | | Not available | |

HDPE1 = high-density polyethylene, melt index = 2.0 g/10 min (190 C., 2160 g), density = 0.96 g/cc
HDPE3 = high-density polyethylene, melt index = 1.2 g/10 min (190 C., 2160 g), density = 0.967 g/cc
HC MB = hydrocarbon masterbatch containing 40% hydrocarbon and 60% high-density polyethylene
Nuc MB = nucleating agent masterbatch containing 4% nucleating agent in a low-density polyethylene
EVA1 = ethylene vinyl acetate copolymer, vinyl acetate content = 12%, density 0.93 g/cc
EVA2 = ethylene vinyl acetate copolymer, vinyl acetate content = 26%, density 0.95 g/cc
[2]MVTR Testing Conditions: ASTM 1249, conditions of 100° F. and 90% Rh The melt index of the thermoformable base films was measured using ASTMD1238-10 and conditions of 190° C. and 2,160 g. Each film was tested five times, and the average of the five tests reported. Comparative Example 1 was found to have a melt flow rate of about 1.55 g/10 min. Example 1 was found to have a melt flow rate of about 1.9 g/10 min. This is at least 20% greater than a thermoformable base film that is identical with the exception that the film is free from hydrocarbon resin (Comparative Example 1). A third thermoformable base film, similar to Example 1, having a thickness of 10 mil and an overall hydrocarbon resin loading of 10 weight % of the thermoformable base film, was found to have a melt flow rate of about 2.28 g/10 min. Ideally, the thermoformable base film has a hydrocarbon resin loading that increases the melt flow rate of the thermoformable base film by at least 20% or between 20% and 50%.

High Oxygen Barrier Version

Thermoformable base film Example 3 was manufactured using a standard blown film coextrusion process, collapsing the bubble into a single palindromic film. The details of these films are shown in Table 2 and the structure is shown in FIG. 3. Example 3 contains a first layer having a high-density polyethylene and a nucleating agent, a second layer containing a high-density polyethylene, a hydrocarbon resin and a nucleating agent a third layer containing a high-density polyethylene and a nucleating agent, an oxygen barrier layer containing EVOH and tie layers. The second layer is split into four distinct layers, separated by other layers. The oxygen barrier layer is split into two distinct layers, separated by other layers. The first layer and the third layer have identical composition.

TABLE 2

Thermoformable Base Film Details

| | Example 3 | |
|---|---|---|
| Base Film Layer (see FIG. 3) | Layer % (by mass) | Layer Components |
| 1 (first layer) | 8.34 | 99% HDPE1 1% Nuc MB |
| 2 (second layer) | 9.91 | 61.5% HDPE3 37.5% HC MB 1% Nuc MB |
| 3 (tie layer) | 5.17 | 100% MAgPE |
| 4 (O2 barrier layer) | 7.175 | 100% EVOH |
| 5 (tie layer) | 5.17 | 100% MAgPE |

TABLE 2-continued

Thermoformable Base Film Details

| | Example 3 | |
|---|---|---|
| Base Film Layer (see FIG. 3) | Layer % (by mass) | Layer Components |
| 6 (second layer) | 9.91 | 61.5% HDPE3 37.5% HC MB 1% Nuc MB |
| 7 (center layer) | 8.65 | 50% EVA1 50% EVA2 |
| 8 (second layer) | 9.91 | 61.5% HDPE3 37.5% HC MB 1% Nuc MB |
| 9 (tie layer) | 5.17 | 100% MAgPE |
| 10 (O2 barrier layer) | 7.175 | 100% EVOH |
| 11 (tie layer) | 5.17 | 100% MAgPE |
| 12 (second layer) | 9.91 | 61.5% HDPE3 37.5% HC MB 1% Nuc MB |
| 13 (third layer) | 8.34 | 99% HDPE1 1% Nuc MB |
| Film Thickness | 15 mil (381 micron) | |
| Flat film OTR[1] | 0.004 cm3/100 in2/day | |

HDPE1 = high-density polyethylene, melt index = 2.0 g/10 min (190 C., 2160 g), density = 0.96 g/cc
HDPE3 = high-density polyethylene, melt index = 1.2 g/10 min (190 C., 2160 g), density = 0.967 g/cc
HC MB = hydrocarbon masterbatch containing 40% hydrocarbon and 60% high-density polyethylene
Nuc MB = nucleating agent masterbatch containing 4% nucleating agent in a low-density polyethylene
EVA1 = ethylene vinyl acetate copolymer, vinyl acetate content = 12%, density 0.93 g/cc
EVA2 = ethylene vinyl acetate copolymer, vinyl acetate content = 26%, density 0.95 g/cc
MAgPE = maleic anhydride grafted polyethylene
EVOH = ethylene vinyl alcohol copolymer, 38 mol % ethylene
[1]OTR Testing Conditions: ASTM F1927, conditions of 73° F. and 0% Rh Weight Gain Study A weight gain study was carried out according to Method B of ASTM D7709-12, resulting in a comparison of weight gain per cavity for packages including thermoformed bases according to this disclosure as well as other blister packaging industry standard materials. The blister cards contained ten cavities formed to size zero blisters. Test units of five blister cards were used to calculate the weight gain. The blisters were filled with desiccant (previously stored in vacuum packed foil packaging) and sealed on the Uhlman B1240 packaging equipment described above. The storage conditions used were 40° C. and 75% RH.

The weight gain study included thermoformed bases from two different thermoformable base films. The first was Example 2 described in Table 1 above. The second was Example 4 which is a 10 mil white thermoformable base film, further described in Table 3.

TABLE 3

Thermoformable Base Film Details

| Base Film Layer | Example 4 | |
|---|---|---|
| | Layer % (by mass) | Layer Components |
| 1 (first layer) | 11.97 | 99% HDPE1<br>1% Nuc MB |
| 2 (second layer) | 19.59 | 61.5% HDPE3<br>37.5% HC MB<br>1% Nuc MB |
| 3 (fourth layer) | 14.92 | 61.5% HDPE3<br>15% CaCO₃ MB<br>10% White MB |
| 4 (center layer) | 7.04 | 50% EVA1<br>50% EVA2 |
| 5 (fourth layer) | 14.92 | 61.5% HDPE3<br>15% CaCO₃ MB<br>10% White MB |
| 6 (second layer) | 19.59 | 61.5% HDPE3<br>37.5% HC MB<br>1% Nuc MB |
| 7 (third layer) | 11.97 | 99% HDPE1<br>1% Nuc MB |
| Film Thickness | 10 mil (254 micron) | |

HDPE1 = high-density polyethylene, melt index = 2.0 g/10 min (190 C., 2160 g), density = 0.96 g/cc
HDPE3 = high-density polyethylene, melt index = 1.2 g/10 min (190 C., 2160 g), density = 0.967 g/cc
HC MB = hydrocarbon masterbatch containing 40% hydrocarbon and 60% high-density polyethylene
Nuc MB = nucleating agent masterbatch containing 4% nucleating agent in a low-density polyethylene
CaCO₃ MB = calcium carbonate masterbatch containing polyethylene with greater than 30% inorganic content
White MB = white masterbatch containing polyethylene with titanium dioxide
EVA1 = ethylene vinyl acetate copolymer, vinyl acetate content = 12%, density 0.93 g/cc
EVA2 = ethylene vinyl acetate copolymer, vinyl acetate content = 26%, density 0.95 g/cc Both thermoformed bases, formed into blisters, were filled with desiccant and sealed with Lid A. Lid A had a heat-resistant exterior layer of high-density polyethylene and an inorganic particle (calcium carbonate), an interior layer having a high-density polyethylene and a nucleating agent, and a heat-sealing exterior layer containing a polyethylene-based plastomer.

The results of the weight gain study can be seen in FIG. 9. The combination of Example 2 base and Lid A resulted in single cavity transmission of about 0.34 mg/cavity·day. The combination of Example 4 base and Lid A resulted in single cavity transmission of about 0.45 mg/cavity·day. By comparison, a similar test run using a forming film of 10 mil PVC/90 gsm PVDC/1 mil PE with a 1 mil soft tempered foil lid resulted in a transmission rate of about 0.54 mg/cavity·day and a forming film of 7.5 mil PVC/2 mil Aclar with a 1 mil soft tempered foil lid resulted in a transmission rate of about 0.16 mg/cavity·day. The thermoformed bases described herein deliver moisture transmission rates that are suitable for pharmaceutical packaging while achieving single stream recyclability.

Improvement on Cutting

While creating packages on the Uhlman B1240 packaging equipment, it is also possible to evaluate the cutting performance of the thermoformable base film. The blister cards are cut from the web after the package is sealed. It was observed that the thermoformable film of Example 4 cut much cleaner, without fraying the edges of the blister card, than other thermoformable base films that did not contain a layer with an inorganic particle (calcium carbonate).

Heat Sealing Study

Heat seal strength was studied, varying the overall density of the first layer. Flat samples of thermoformable base materials having various blends in the first layer were heat sealed to lidding material (Lid A described in the Weight Gain Study above) and the seal strength was measured. Heat seals were formed using a flat seal bar with conditions of 30 PSI pressure and 0.5 seconds dwell. The temperature was varied to understand how the first layer blend could change the seal strength at a given seal temperature. Seal strength was tested by loading a one-inch (25.4 mm) strip of heat sealed film on a tensile testing unit, pulling the heat seal apart at an angle of 180 degrees and at a speed of 12 in/min. Testing was completed at 73° F. and 50% humidity. Each data point in the table below is the average of three tests, recording the peak force.

The heat seals peeled open at all of the sealing conditions except 130° C. when the lidding remained bonded and the tensile strength of the films were beginning to be weaker than the bond strength.

It was found that stronger seals (higher heat seal strengths) were obtained when a higher loading of lower density material was present in the first layer. Up to about 50 weight % of a polyethylene having a density less than 0.93 g/cm³ could be used in the first layer without other side effects such as sticking to heating plates or thermoforming issues.

TABLE 4

Heat Seal Strength Data

| First Layer Blend: | 85% HDPE 15% mLLDPE (overall density = 0.954 g/cm³) | 70% HDPE 30% mLLDPE (overall density = 0.947 g/cm³) | 50% HDPE 50% mLLDPE (overall density = 0.940 g/cm³) | 50% HDPE 50% ethylene-based plastomer (d = 0.930 g/cm³) |
|---|---|---|---|---|
| T = 80° C. | N/A | 82 g/25.4 mm | 158 g/25.4 mm | 451 g/25.4 mm |
| T = 90° C. | 956 g/25.4 mm | 357 g/25.4 mm | 704 g/25.4 mm | 1070 g/25.4 mm |
| T = 100° C. | 1304 g/25.4 mm | 892 g/25.4 mm | 903 g/25.4 mm | 1394 g/25.4 mm |
| T = 110° C. | 1929 g/25.4 mm | 1150 g/25.4 mm | 1193 g/25.4 mm | 1420 g/25.4 mm |
| T = 120° C. | 2588 g/25.4 mm | 1488 g/25.4 mm | 1534 g/25.4 mm | 1907 g/25.4 mm |
| T = 130° C. | 2838 g/25.4 mm | 1840 g/25.4 mm | 2067 g/25.4 mm | 2413 g/25.4 mm |

Further study of the heat seal strength provides the data in Table 5. The testing was done as described above, except that the heat seals were formed using a flat seal bar with conditions of 40 PSI pressure and 1.0 seconds of dwell.

TABLE 5

Heat Seal Strength Data

| First Layer Blend: | 50% HDPE 50% mLLDPE (overall density = 0.942 g/cm³) | 50% HDPE 50% LDPE (overall density = 0.941 g/cm³) |
|---|---|---|
| T = 87.8° C. | 419 g/25.4 mm | 847 g/25.4 mm |
| T = 93.3° C. | 970 g/25.4 mm | 1825 g/25.4 mm |
| T = 98.9° C. | 1695 g/25.4 mm | 2373 g/25.4 mm |
| T = 104.4° C. | 1985 g/25.4 mm | 2675 g/25.4 mm |
| T = 110.0° C. | 2167 g/25.4 mm | 3519 g/25.4 mm |
| T = 115.6° C. | 2250 g/25.4 mm | 3636 g/25.4 mm |
| T = 121.1° C. | 2408 g/25.4 mm | 3881 g/25.4 mm |

Embodiments

Thermoformable Base Film Embodiments:
A. A thermoformable base film comprising:
   a first layer comprising at least one polyethylene and having an overall density between about 0.92 g/cm³ and 0.97 g/cm³,
   a second layer comprising a high-density polyethylene and a hydrocarbon resin, and
   a third layer comprising at least one polyethylene and having an overall density between about 0.92 g/cm³ and 0.97 g/cm³,
   wherein the second layer is located between the first layer and the third layer, and wherein after thermoforming, the thermoformable base film maintains the shape taken during thermoforming.
B. The thermoformable base film according to any other embodiment, further comprising a fourth layer comprising a high-density polyethylene and an inorganic particle, wherein the inorganic particle is present in the fourth layer at a level of at least 5% by weight and wherein the fourth layer is between the first layer and the third layer.
C. The thermoformable base film according to embodiment B, wherein the inorganic particle is calcium carbonate.
D. The thermoformable base film according to any other embodiment, wherein the first layer a blend of high-density polyethylene and a polyethylene having a density less than 0.93 g/cm³.
E. The thermoformable base film according to any other embodiment, wherein the at least one polyethylene of the first layer is a medium density polyethylene.
F. The thermoformable base film according to any other embodiment, further comprising an oxygen barrier layer comprising an ethylene vinyl alcohol copolymer, wherein the oxygen barrier layer is located between the first layer and the third layer.
G. The thermoformable base film according to any other embodiment, wherein the first layer and the third layer each form a surface of the thermoformable base film.
H. The thermoformable base film according to any other embodiment, wherein the thermoformable base film has a thermoforming temperature operating window of at least 6° C.
I. The thermoformable base film according to any other embodiment, wherein the hydrocarbon resin is present from 5% to 10% by weight with respect to the thermoformable base film and wherein the melt index of the thermoformable base film is between 1.7 and 2.3 g/10 min (190° C., 2160 g).
J. A thermoformable base film comprising:
   a first layer comprising a high-density polyethylene and a polyethylene having a density less than 0.92 g/cm³,
   a second layer comprising from 60% to 90%, by weight, of a high-density polyethylene and from 2.5 to 30%, by weight of a hydrocarbon resin, and
   a third layer comprising at least one polyethylene and having an overall density between about 0.92 g/cm³ and 0.97 g/cm³,
   wherein the second layer is located between the first layer and the third layer, wherein the second layer has a thickness that is from 25% to 90% of the total thickness of the thermoformable base film.
K. The thermoformable base film according to any other embodiment, wherein the overall density of the thermoformable base film is less than 1.0 g/cm³.
L. The thermoformable base film according to any other embodiment, wherein the thermoformable base film is essentially free from polyester, ethylene vinyl alcohol copolymer and polyamide.

Thermoformed Base Embodiments:
M. A thermoformed base comprising
   the thermoformable base film according to any embodiment A-L,
   at least one cavity, and
   a flange surrounding each of the cavities.
N. The thermoformed base according to embodiment M, wherein the thermoformed base maintains the shape taken during thermoforming.

Packaged Product Embodiments:
O. A packaged product comprising:
   the thermoformed base according to embodiment M or N,
   a lid packaging component, and
   a product,
   wherein the lid packaging component is hermetically sealed to the flange of the thermoformed base and the product is enclosed in the at least one cavity of the thermoformed base.
P. The packaged product according to embodiment O, wherein the lid packaging component comprises a heat-sealing layer and a layer comprising at least one of metal or paper.
Q. The packaged product according to any other embodiment, wherein the lid packaging component is peelably sealed to the flange of the thermoformed base.
R. The packaged product according to embodiment O, Q, S or T, wherein both the thermoformed base and the lid packaging component are recyclable in the same recycle process.
S. The packaged product according to any other embodiment, wherein the at least one cavity of the thermoformed base may be depressed manually, and the product may be pushed through the lid packaging component for product dispensing.
T. The packaged product according to embodiment O, Q, R or S, wherein the lid packaging component comprises
   a first exterior layer comprising a high-density polyethylene and an inorganic particle,
   a first interior layer comprising a high-density polyethylene and optionally a hydrocarbon resin, and
   a second exterior layer comprising a polyethylene-based material.

What is claimed is:

1. A thermoformable base film comprising:
a first layer comprising at least one polyethylene and having an overall density between about 0.92 g/cm$^3$ and 0.97 g/cm$^3$,
multiple second layers, each comprising a high-density polyethylene and a hydrocarbon resin, and
a third layer comprising at least one polyethylene and having an overall density between about 0.92 g/cm$^3$ and 0.97 g/cm$^3$,
wherein the multiple second layers are located between the first layer and the third layer, and wherein after thermoforming, the thermoformable base film maintains a shape taken during thermoforming.

2. The thermoformable base film according to claim 1, wherein the multiple second layers are separated by other layers.

3. The thermoformable base film according to claim 1, further comprising a fourth layer comprising a high-density polyethylene and an inorganic particle, wherein the inorganic particle is present in the fourth layer at a level of at least 5% by weight and wherein the fourth layer is between the first layer and the third layer.

4. The thermoformable base film according to claim 3, wherein the inorganic particle is calcium carbonate.

5. The thermoformable base film according to claim 1, wherein the first layer comprises a blend of high-density polyethylene and a polyethylene having a density less than 0.93 g/cm$^3$.

6. The thermoformable base film according to claim 1, wherein the first layer and the third layer each form a surface of the thermoformable base film.

7. The thermoformable base film according to claim 1, further comprising an oxygen barrier layer comprising an ethylene vinyl alcohol copolymer, wherein the oxygen barrier layer is located between the first layer and the third layer.

8. The thermoformable base film according to claim 1, wherein the hydrocarbon resin is present from 5% to 10% by weight with respect to the thermoformable base film and wherein the melt index of the thermoformable base film is between 1.7 and 2.3 g/10 min (190° C., 2160 g).

9. A thermoformed base comprising:
the thermoformable base film according to claim 1,
at least one cavity, and
a flange surrounding each of the cavities.

10. A packaged product comprising:
the thermoformed base according to claim 9,
a lid packaging component, and
a product,
wherein the lid packaging component is hermetically sealed to the flange of the thermoformed base and the product is enclosed in the at least one cavity of the thermoformed base.

11. The packaged product according to claim 10, wherein the lid packaging component comprises a heat-sealing layer and a layer comprising at least one of metal and paper.

12. The packaged product according to claim 10, wherein the lid packaging component is peelably sealed to the flange of the thermoformed base.

13. The packaged product according to claim 10, wherein the thermoformed base and the lid packaging component are recyclable in the same recycle process.

14. The packaged product according to claim 10, wherein the at least one cavity of the thermoformed base may be depressed manually, and the product may be pushed through the lid packaging component for product dispensing.

15. A thermoformable base film comprising:
a first layer comprising a blend of a high-density polyethylene or a medium-density polyethylene and a polyethylene having a density less than 0.92 g/cm3,
a second layer comprising from 60% to 90%, by weight, of a high-density polyethylene and from 2.5 to 30%, by weight of a hydrocarbon resin, and
a third layer comprising at least one polyethylene and having an overall density between about 0.92 g/cm$^3$ and 0.97 g/cm$^3$,
wherein the second layer is located between the first layer and the third layer,
wherein the second layer has a thickness that is from 25% to 90% of the total thickness of the thermoformable base film.

16. The thermoformable base film according to claim 15, wherein the third layer comprises a blend of a high-density polyethylene or a medium-density polyethylene and a polyethylene having a density less than 0.92 g/cm$^3$.

17. The thermoformable base film according to claim 15, wherein the overall density of the thermoformable base film is less than 1.0 g/cm$^3$.

18. A thermoformable base film comprising:
a first layer comprising at least one polyethylene and having an overall density between about 0.92 g/cm$^3$ and 0.97 g/cm$^3$,
a second layer comprising from 60% to 90%, by weight, of a high-density polyethylene and from 2.5 to 30%, by weight of a hydrocarbon resin, and
a third layer comprising a blend of a high-density polyethylene or a medium-density polyethylene and a polyethylene having a density less than 0.92 g/cm$^3$,
wherein the second layer is located between the first layer and the third layer,
wherein after thermoforming, the thermoformable base film maintains a shape taken during thermoforming.

19. The thermoformable base film according to claim 18, wherein the second layer has a thickness that is from 25% to 90% of the total thickness of the thermoformable base film.

20. The thermoformable base film according to claim 18, further comprising a fourth layer comprising a high-density polyethylene and an inorganic particle, wherein the inorganic particle is present in the fourth layer at a level of at least 5% by weight and wherein the fourth layer is between the first layer and the third layer.

* * * * *